United States Patent
Aridomi et al.

(10) Patent No.: US 10,688,763 B2
(45) Date of Patent: Jun. 23, 2020

(54) DECORATIVE FILM AND DECORATIVE MOLDED BODY

(71) Applicant: FUJIFILM CORPORATION, Minato-ku, Tokyo (JP)

(72) Inventors: Takashi Aridomi, Shizuoka (JP); Shinichi Kanna, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/421,503

(22) Filed: May 24, 2019

(65) Prior Publication Data

US 2019/0275777 A1    Sep. 12, 2019

Related U.S. Application Data

(63) Continuation of application No. PCT/JP2017/043996, filed on Dec. 7, 2017.

(30) Foreign Application Priority Data

Dec. 16, 2016 (JP) ................................ 2016-244934

(51) Int. Cl.
| | |
|---|---|
| *B32B 33/00* | (2006.01) |
| *B32B 27/20* | (2006.01) |
| *B32B 15/08* | (2006.01) |
| *B29C 45/14* | (2006.01) |
| *B29C 45/16* | (2006.01) |
| *B44C 1/10* | (2006.01) |
| *B44C 1/00* | (2006.01) |

(52) U.S. Cl.
CPC .............. *B32B 33/00* (2013.01); *B29C 45/14* (2013.01); *B29C 45/16* (2013.01); *B32B 15/08* (2013.01); *B32B 27/20* (2013.01); *B44C 1/00* (2013.01)

(58) Field of Classification Search
None
See application file for complete search history.

(56) References Cited

U.S. PATENT DOCUMENTS

2015/0168620 A1 * 6/2015 Hakuta ................... B32B 7/02
359/359

FOREIGN PATENT DOCUMENTS

| EP | 1316419 A2 | 6/2003 |
|---|---|---|
| JP | H05-111991 A | 5/1993 |
| JP | H09-183136 A | 7/1997 |
| JP | 2005-238698 A | 9/2005 |
| JP | 2005-271405 A | 10/2005 |
| JP | 2011-79178 A | 4/2011 |
| JP | 2013-241528 A | 12/2013 |
| JP | 2014-223773 A | 12/2014 |
| JP | 2015-66855 A | 4/2015 |
| JP | 2015-182301 A | 10/2015 |
| JP | 2016-68361 A | 5/2016 |

OTHER PUBLICATIONS

International Search Report issued in International Application No. PCT/JP2017/043996 dated Feb. 13, 2018.
Written Opinion of the ISA issued in International Application No. PCT/JP2017/043996 dated Feb. 13, 2018.
Extended European Search Report dated Oct. 29, 2019, issued in corresponding EP Patent Application No. 17880109.8.
English language translation of the following: Office action dated Mar. 31, 2020 from the JPO in a Japanese patent application No. 2018-556624 corresponding to the instant patent application.

* cited by examiner

*Primary Examiner* — Sheeba Ahmed
(74) *Attorney, Agent, or Firm* — Solaris Intellectual Property Group, PLLC

(57) ABSTRACT

Provided are a decorative film including a base film, and a metal-containing layer which contains tabular metal particles on one surface of the base film; and a decorative molded body.

13 Claims, 1 Drawing Sheet

DECORATIVE FILM AND DECORATIVE MOLDED BODY

CROSS-REFERENCE TO RELATED APPLICATION

This application is a continuation application of International Application No. PCT/JP2017/043996, filed Dec. 7, 2017, the disclosure of which is incorporated herein by reference in its entirety. Further, this application claims priority from Japanese Patent Application No. 2016-244934, filed Dec. 16, 2016, the disclosure of which is incorporated herein by reference in its entirety.

BACKGROUND OF THE INVENTION

1. Field of the Invention

The present disclosure relates to a decorative film and a decorative molded body.

2. Description of the Related Art

At the time of molding a resin material, a decorative molded body is obtained by disposing a decorative film on a surface of a resin which becomes a molded base material, performing molding, and imparting metallic gloss to the surface thereof, coloring the surface to have a desired hue, or providing a desired pattern for the surface.

For example, at the time of formation of a resin molded article, a decorative molded body in which a decorative film is integrated with a surface of an obtained molded body is obtained by disposing the decorative film in a mold, injecting a base material resin into the mold, and performing molding.

The injection molding which is performed after a decorative film is disposed in a mold in advance is usually referred to as film insert molding or simply referred to as insert molding.

According to the insert molding, metallic gloss, a desired hue, a desired pattern, and the like can be imparted to a surface of a molded body, and the adhesiveness of a decorative film to the molded body is improved by integrating the decorative film with a resin base material.

Further, the steps are simpler, and a molded body having a more complicated shape can be formed, compared to a method of bonding a decorative film to a surface of a molded body after formation of the molded body.

As a decorative material for molding, a decorative sheet for molding, including a surface layer, a decorative layer, and a base layer in this order, in which the decorative layer has a layer formed by vacuum-depositing indium, aluminum, silver, tin, nickel, or a combination of these metals on a plastic film has been suggested (for example, see JP2011-079178A).

Further, as a method of producing a decorative molded body having metallic gloss, a method of producing a decorative molded body, including: injecting a resin from a predetermined gate portion with a specific mold using a decorative film that includes a vapor deposition layer on a base film to produce a decorative molded body which includes a metallic gloss film layer and in which degradation of designability due to distortion of the metallic gloss film layer is suppressed has been suggested (for example, see JP2014-223773A).

SUMMARY OF THE INVENTION

In order to realize high designability in a decorative film having gloss, there has been a demand for a decorative film having glossiness and excellent moldability which can also be applied to a molded body having a complicated shape.

In the decorative sheet described in JP2011-079178A, since a metal layer is formed by vapor deposition and an obtained metal vapor deposition layer has mirror surface properties, excellent gloss is observed in a case where the layer is observed from a light incident direction. However, excellent gloss may not be observed in a case where the observation angle is different from the light incident direction. Further, since a metal vapor deposition layer has a low shape followability at the time of molding, there is a problem in that application of a decorative film having a metal vapor deposition layer to a molded body with a complicated shape is difficult.

Further, even in the decorative film described in JP2014-223773A, the metal vapor deposition film layer that imparts metallic gloss to the surface of the decorative molded body does not have excellent glossiness due to distortion at the time of molding. As a method for solving the problem, a method of applying a mold having a specific shape in which a gate is provided at a specific position has been suggested, but the configuration of the decorative film itself has not been considered at all. Accordingly, in a case where the decorative film described in JP2014-223773A is applied to a typical mold for carrying out molding, the shape followability is not sufficient similar to the case of the decorative sheet described in JP2011-079178A. Therefore, it is difficult to obtain a molded body having an appearance with excellent glossiness.

An object of an embodiment of the present invention is to provide a decorative film which can provide an appearance with excellent gloss and has excellent moldability.

An object of another embodiment of the present invention is to provide a decorative molded body which has an appearance with excellent gloss and can be formed into a complicated shape.

The means for achieving the above-described objects includes the following embodiments.

<1> A decorative film comprising: a base film; and a metal-containing layer which contains tabular metal particles, on one surface of the base film.

<2> The decorative film according to <1>, in which the metal-containing layer further contains at least one selected from a polymerizable compound containing a radically polymerizable unsaturated group or a cured product of the polymerizable compound containing a radically polymerizable unsaturated group (hereinafter, also referred to as a polymerizable compound or a cured product thereof).

<3> The decorative film according to <2>, in which the polymerizable compound or the cured product thereof contains at least one selected from the group consisting of a urethane skeleton and an alkylene oxide group having 2 or 3 carbon atoms.

<4> The decorative film according to any one of <1> to <3>, in which the metal-containing layer further contains a binder resin.

<5> The decorative film according to any one of <1> to <4>, in which the thickness of the metal-containing layer is 1 μm or greater.

<6> The decorative film according to any one of <1> to <5>, further comprising: a colored layer which contains a colorant other than the tabular metal particles on a surface of the metal-containing layer opposite to a side where the base film is provided.

<7> The decorative film according to <6>, in which the colored layer further contains a polymerizable compound or a cured product of the polymerizable compound.

<8> The decorative film according to any one of <1> to <7>, in which the base film contains 60% by mass or greater of an acrylonitrile/butadiene/styrene copolymer resin (hereinafter, also referred to as an ABS resin) with respect to a total amount of the resin contained in the base film.

<9> The decorative film according to any one of <1> to <8>, in which an average thickness of the tabular metal particles is from 0.001 μm to 1 μm.

<10> The decorative film according to any one of <1> to <9>, in which an aspect ratio of the tabular metal particles is from 40 to 1000.

<11> The decorative film according to any one of <1> to <10>, in which an average major axis diameter of the tabular metal particles is from 1 μm to 100 μm.

<12> The decorative film according to any one of <1> to <11>, in which a content of the tabular metal particles in the metal-containing layer is from 5% by mass to 40% by mass with respect to a total mass of the metal-containing layer.

<13> The decorative film according to any one of <1> to <12>, which is used for insert molding.

<14> A decorative molded body comprising: a molded base material; and the decorative film according to any one of <1> to <13> on the molded base material.

According to an embodiment of the present invention, it is possible to provide a decorative film which can provide an appearance with excellent gloss and has excellent moldability.

According to another embodiment of the present invention, it is possible to provide a decorative molded body which has an appearance with excellent gloss and can be formed into a complicated shape.

DESCRIPTION OF THE PREFERRED EMBODIMENTS

Figure 1:
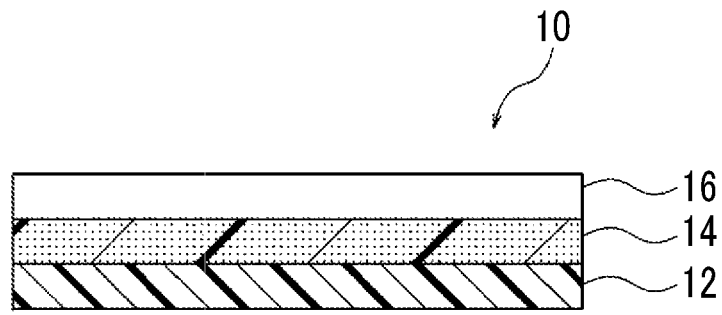
FIG. 1 is a schematic cross-sectional view illustrating a layer configuration of a decorative film according to an embodiment of the present invention.

Hereinafter, a decorative film and a decorative molded body according to an embodiment of the present disclosure will be described in detail.

Further, the numerical ranges shown using "to" in the description below indicate ranges including the numerical values described before and after "to" as the lower limits and the upper limits. Further, in a case where only the upper limits or the lower limits have the units, this means that the whole numerical ranges have the same units.

The "steps" in the present specification include not only independent steps but also steps whose intended purposes are achieved even in a case where the steps cannot be precisely distinguished from other steps.

In the numerical ranges described in a stepwise manner in the present specification, the upper limits or the lower limits described in certain numerical ranges may be replaced with the upper limits or the lower limits in other numerical ranges described in a stepwise manner. Further, in the numerical ranges described in the present specification, the upper limits or the lower limits described in certain numerical ranges may be replaced with values described in examples.

<Decorative Film>

A decorative film according to the embodiment of the present disclosure includes a base film, and a metal-containing layer which contains tabular metal particles (hereinafter, also referred to as specific metal particles) on one surface of the base film.

The mechanism of the decorative film according to the embodiment of the present disclosure is not clear, but is assumed as follows.

As a layer configuration of a decorative film of the related art, for example, the decorative film comprises a metal vapor deposition layer serving as a metal-containing layer on a base material. Since the metal vapor deposition layer is uniform and a surface thereof is extremely smooth, the light reflectivity in a direction perpendicular to an incident direction is excellent, and excellent metallic gloss is observed. However, the metallic gloss in a case where the layer is observed in other directions is not excellent.

Since the decorative film according to the embodiment of the present disclosure includes a metal-containing layer containing specific metal particles, the specific metal particles are likely to be arranged such that each surface thereof having a wide area is in parallel with the surface of the base film at the time of preparation of the metal-containing layer so that the specific metal particles have excellent metallic gloss.

Further, since individual specific metal particles are independently present in the metal-containing layer, irregular reflection of incidence rays easily occurs compared to a metal vapor deposition layer formed by vapor deposition. Accordingly, it is considered that excellent metallic gloss resulting from reflected light on the plane of each tabular metal particle can be observed not only in the light incident direction but also in many other directions.

Further, since individual specific metal particles are independently present in the metal-containing layer, the metal-containing layer is likely to be deformed compared to the metal vapor deposition layer formed by vapor deposition, and thus the shape followability, the workability, and the like of the decorative film are excellent. Therefore, in a case where the decorative film is applied to a decorative molded body, a molded body having a more complicated shape can be obtained. Further, effects for suppressing defects in appearance caused by cracks of the metal-containing layer because of containing specific metal particles and for improving the concealing property with respect to the color of the molded base material of the decorative molded body are considered to be exhibited.

Further, the shielding property indicates a property in which the color of a material disposed behind of the decorative film is not visually recognized from the surface side of the decorative film.

The decorative film according to the embodiment of the present disclosure may further comprise a colored layer on a surface of the metal-containing layer opposite to a side where the base film is provided. In a case where the decorative layer comprises the colored layer on the surface of the metal-containing layer, various hues can be imparted to the decorative film. Further, in the formed colored layer, light incident from the colored layer side of the decorative film is transmitted through the colored layer, reflected on the surface of the metal-containing layer, and transmitted through the colored layer again. Therefore, it is considered that a deep tint is observed due to the combination of the light reflected on the metal-containing layer and the light transmitted through the colored layer, in addition to light absorption of incidence rays on the colored layer and light reflection, and thus a decorative film having excellent designability is obtained.

Further, the present disclosure is not limited to the above-described assumed mechanism at all.

[Metal-Containing Layer]

The metal-containing layer in the decorative film according to the embodiment of the present disclosure contains specific metal particles.

Since the decorative film includes the metal-containing layer containing specific metal particles on one surface of the base film, the specific metal particles in the metal-containing layer are present on the surface of the base film such that the plane direction of each particle is aligned almost in parallel with each other based on the shape thereof. Accordingly, the decorative film has excellent metallic gloss, and the concealing property of the base film is improved.

(Tabular Metal Particles)

The light reflectivity of the specific metal particles is considered to be further improved because the specific metal particles tend to be aligned in the metal-containing layer at the time of formation of the metal-containing layer, for example, compared to spherical metal particles, and the area contributing to light reflection is increased.

Examples of the specific metal particles contained in the metal-containing layer include aluminum particles, gold particles, platinum particles, silver particles, and copper particles.

Among these, aluminum particles, gold particles, platinum particles, and the like are preferable from the viewpoint that the glossiness of the decorative film is excellent and discoloration over time is unlikely to occur, and aluminum particles are more preferable from the viewpoints of being lightweight and advantageous in cost.

The specific metal particles in the present specification indicate particles having an aspect ratio of 10 to 20000. The aspect ratio is preferably in a range of 50 to 10000 and more preferably in a range of 40 to 1000.

The aspect ratio of particles indicates a value obtained by dividing the average major axis diameter of the specific metal particles in the projected drawing by the average thickness of the specific metal particles.

The shapes of the specific metal particles are not particularly limited, and examples thereof include particles having any projected shapes such as a circular shape; an elliptical shape; a rectangular shape; and a flake shape such as a scaly shape or an indeterminate shape.

Among these, from the viewpoint of easily imparting excellent gloss, metallic feeling, brightness, and the like to the metal-containing layer, specific metal particles having projected shapes such as a rectangular shape, a flake shape, and a scaly shape are preferable.

As the size of the specific metal particles, the average thickness is preferably in a range of 0.001 µm to 1 µm, and the average major axis diameter in the projected drawing is preferably in a range of 1 µm to 100 µm. In these preferable sizes, particles in which the relationship between the thickness and the major axis diameter satisfies the aspect ratio described above.

From the viewpoint of the gloss, the major axis diameter of the specific metal particles is preferably 1 µm or greater, more preferably 10 µm or greater, and still more preferably 15 µm or greater.

Further, from the viewpoint that the handling during production is excellent, the major axis diameter of the specific metal particles is preferably 100 µm or less and more preferably 50 µm or less.

From the viewpoint of easily arranging the specific metal particles in parallel in the metal-containing layer, it is preferable that the major axis diameter of the specific metal particles is greater than or equal to the thickness of the metal-containing layer containing the specific metal particles.

The thickness of the specific metal particles is preferably 0.001 µm or greater, more preferably 0.01 µm or greater, and still more preferably 0.1 µm or greater.

Further, from the viewpoint of more easily aligning the specific metal particles in the metal-containing layer, the thickness of the specific metal particles is preferably 1 µm or less and more preferably 0.5 µm or less.

A typical method can be used as the method of measuring the size of the specific metal particles.

For example, the size of the particles can be measured by enlarging and observing the particles using a transmission electron microscope (TEM), a field emission transmission electron microscope (FE-TEM), a field emission scanning electron microscope (FE-SEM), or the like.

In the present specification, 100 pieces of the specific metal particles observed by being enlarged by any of the above-described devices are randomly selected, the maximum length (major axis diameter) of each particle in the major axis direction is measured, and the average value of the measured major axis diameters is employed as the average major axis diameter. In metal particles with various shapes such as an elliptical shape, a rectangular shape, a flake shape, an indeterminate shape, and a scaly shape, the average major axis diameter is set to be obtained by measuring the length of each particle in the major axis direction in a case of measuring the particle diameter.

The major axis diameter indicates a long side of a circumscribed rectangle of a particle, the minor axis diameter of a particle indicates a short side of a circumscribed rectangle of the particle, and the average major axis diameter indicates an arithmetic average value of the major axis diameters of 100 particles.

Further, the thickness of the specific metal particles can be measured by enlarging and observing a cross section of a coated film containing the specific metal particles using any of the above-described devices.

For example, in order to measure the size of particles contained in commercially available plate-like metal pigment-containing paste, specific metal particle dispersion liquids, and the like, an excess amount of a solvent that does not dissolve metals is added to paste or a dispersion liquid, only the specific metal particles are segregated, and the measurement may be carried out according to the above-described method.

In order to measure the size of specific metal particles contained in a decorative film, a metal-containing layer, and the like, matrix components are dissolved and removed using a solvent which can dissolve matrix components of a metal-containing layer and does not dissolve metals, the specific metal particles are segregated, and the measurement may be carried out according to the above-described method. In a case of a decorative film, first, a base film is peeled from the decorative film so that only a metal-containing layer remains, and the measurement may be carried out in the same manner as described above.

The specific metal particles which can be used in the metal-containing layer can be produced according to a method of the related art.

For example, plate-like aluminum particles can be produced according to a known method such as a production method described in WO99/054074A.

Further, as the specific metal particles, commercially available products may be used. Such products are on the market in a state of paste containing specific metal particles or a state of a dispersion liquid containing specific metal particles.

As the specific metal particles, commercially available products may be used.

Examples of the commercially available products of aluminum particles which can be used as specific metal particles in the decorative film according to the embodiment of the present disclosure include GX Series, BS Series, and MH Series (all manufactured by Asahi Kasei Chemicals Corporation), ALPASTE (registered trademark) Series and DECOMET (registered trademark) Series (both manufactured by Toyo Aluminium K.K.).

The content of the specific metal particles in the metal-containing layer is preferably in a range of 1% by mass to 50% by mass and more preferably in a range of 5% by mass to 40% by mass with respect to the total mass of the metal-containing layer.

In a case where the content of the specific metal particles in the metal-containing layer is 1% by mass or greater, the gloss of the decorative film becomes excellent, and the shielding property is further improved. Further, in a case where the content of the specific metal particles in the metal-containing layer is 50% by mass or less, the moldability of the decorative film is further improved, and the weight of the decorative film can be reduced.

(Dispersant)

From the viewpoint that the uniform dispersibility of the specific metal particles in the metal-containing layer becomes excellent, it is preferable that the metal-containing layer contains a dispersant of the specific metal particles.

In a case where the metal-containing layer contains a dispersant of the specific metal particles, the dispersibility of the specific metal particles in the metal-containing layer is improved, and the gloss and the shielding property are further improved.

Examples of the dispersant include a silicone polymer, an acrylic polymer, and a polyester polymer, and the dispersant can be appropriately selected and then used depending on the purpose thereof. In a case where the heat resistance is expected to be imparted to the decorative film, for example, a silicone polymer such as a graft type silicone polymer is suitably used.

The weight-average molecular weight of the dispersant is preferably in a range of 1000 to 5000000, more preferably in a range of 2000 to 3000000, and particularly preferably in a range of 2500 to 3000000. In a case where the weight-average molecular weight thereof is 1000 or greater, the dispersibility of the specific metal particles is further improved.

For example, the weight-average molecular weight can be measured using gel permeation chromatography (GPC) under the following conditions.

Measurement device: EcoSEC HLC-8320 (trade name, manufactured by Tosoh Corporation)
Column: GPC column TSKgel Super HZM-H (manufactured by Tosoh Corporation)
Carrier: tetrahydrofuran
Measurement temperature: 40° C.
Carrier flow rate: 1.0 ml/min
Sample concentration: 0.1% by mass
Detector: differential refractive index (RI) detector
Standard substance: monodisperse polystyrene As the dispersant of the specific metal particles, commercially available products may be used. Examples of the commercially available products include EFKA 4300 (trade name, manufactured by BASF SE, acrylic polymer dispersant), HOMOGENOL (registered trademark) L-18, HOMOGENOL L-95, and HOMOGENOL L-100 (all manufactured by Kao Corporation), SOLSPERSE (registered trademark) 20000 (manufactured by Lubrizol Corporation), and DISPERBYK (registered trademark) 110, DISPERBYK 164, DISPERBYK 180, and DISPERBYK 182 (all manufactured by BYK Chemie GmbH).

In a case where the metal-containing layer contains a dispersant of the specific metal particles, the metal-containing layer may contain one or two or more kinds of dispersants.

The content of the dispersant of the specific metal particles is preferably in a range of 1 part by mass to 30 parts by mass with respect to 100 parts by mass of the specific metal particles.

From the viewpoints of the uniform dispersibility and the dispersion stability of the specific metal particles, it is preferable that a specific metal particle dispersion containing the specific metal particles and the dispersant thereof is prepared in advance and the dispersion is mixed with a resin at the time of formation of the metal-containing layer.

Further, as described above, commercially available specific metal particle dispersion liquids such as SF Silver Series (manufactured by Sanyo Color Works, Ltd.) described above may be used for forming the metal-containing layer.

(Other Components in Metal-Containing Layer)

In order to obtain a stable layer containing specific metal particles, it is preferable that the metal-containing layer contains components functioning as a matrix. Examples of the components functioning as a matrix include a polymerizable compound, a cured product thereof, and a binder resin.

(Polymerizable Compound)

The metal-containing layer may contain a cured product of a polymerizable compound or an uncured polymerizable compound or may contain both of these.

The polymerizable compound is not particularly limited as long as the compound contains a polymerizable group. Examples of the polymerizable group include an ethylenically unsaturated group which is a radically polymerizable unsaturated group and an epoxy group.

Among these, as the polymerizable compound, an ethylenically unsaturated bond-containing compound is preferable, and a compound containing a (meth)acryloyl group is more preferable.

Examples of the ethylenically unsaturated bond-containing compound include polymerizable compounds described in paragraphs 0023 and 0024 of JP4098550B and bifunctional polymerizable compounds such as tricyclodecanediol dimethanol diacrylate.

Preferred examples of the polymerizable compound include a polymerizable compound containing at least five ethylenically unsaturated groups such as dipentaerythritol hexaacrylate (DPHA), dipentaerythritol (penta/hexa)acrylate, or tripentaerythritol octaacrylate; a urethane-based monomer such as a urethane (meth)acrylate compound; and a bifunctional polymerizable compound such as ethoxylated bisphenol A diacrylate or tricyclodecanediol di(meth)acrylate.

As the polymerizable compound, a commercially available product may be used. Examples of the commercially available product include A-DPH (trade name: dipentaerythritol hexaacrylate) and A-DCP (trade name: tricyclodecane dimethanol diacrylate), manufactured by Shin-Nakamura Chemical Co., Ltd.

(At Least One Selected from Polymerizable Compound Containing Radically Polymerizable Unsaturated Group or Cured Product of Polymerizable Compound Containing Radically Polymerizable Unsaturated Group (Polymerizable Compound or Cured Product Thereof))

It is preferable that the metal-containing layer in the present disclosure further contains at least one selected from a polymerizable compound containing a radically polymerizable unsaturated group or a cured product of the polymerizable compound containing a radically polymerizable unsaturated group, as a polymerizable compound.

The hardness of the metal-containing layer is further improved in a case where the metal-containing layer contains a polymerizable compound or a cured product thereof.

From the viewpoint of further improving the moldability of the metal-containing layer and the decorative film, it is preferable that the polymerizable compound or the cured product thereof contains at least one selected from the group consisting of a urethane skeleton and an alkylene oxide group having 2 or 3 carbon atoms.

In a case where the polymerizable compound or the cured product thereof contains at least one selected from the group consisting of a urethane skeleton and an alkylene oxide group having 2 or 3 carbon atoms, the metal-containing layer has a soft segment in a molecule of a matrix component, and the shape followability and the moldability of the metal-containing layer to be obtained are further improved.

Hereinafter, examples of the polymerizable compound will be described, and the polymerizable compound may be contained in the metal-containing layer as a cured product of the polymerizable compound due to an exposure step described below.

<Polymerizable Compound Having Urethane Skeleton>

As the polymerizable compound having a urethane skeleton, a urethane oligomer is exemplified. Among examples of the urethane oligomer, a urethane (meth)acrylate oligomer is preferable.

As the urethane oligomer, a urethane (meth)acrylate oligomer is preferable, and examples thereof include aliphatic urethane (meth)acrylate and aromatic urethane (meth)acrylate.

Specifically, Oligomer Handbook (supervised by Junji Furukawa, The Chemical Daily Co., Ltd.) can be referred to, and the urethane oligomer described in the above-described document can be appropriately selected depending on the purpose thereof and used for the metal-containing layer in the present disclosure.

The molecular weight of the urethane oligomer is preferably in a range of 800 to 2000 and more preferably in a range of 1000 to 2000.

As the urethane (meth)acrylate oligomer, a commercially available product may be used. Examples of the commercially available product of the urethane (meth)acrylate oligomer include U-2PPA, U-4HA, U-6HA, U-6LPA, U-15HA, U-324A, UA-122P, UA5201, and UA-512 (all trade names, manufactured by Shin-Nakamura Chemical Co., Ltd.); CN964A85, CN964, CN959, CN962, CN963J85, CN965, CN982B88, CN981, CN983, CN991, CN991NS, CN996, CN996NS, CN9002, CN9007, CN9009, CN9010, CN9011, CN9178, CN9788, and CN9893 (all trade names, manufactured by Sartomer Japan Inc.); and EB204, EB230, EB244, EB245, EB270, EB284, EB285, EB810, EB830, EB4835, EB4858, EB1290, EB210, EB215, EB4827, EB4830, EB4849, EB6700, EB204, EB8402, EB8804, and EB8800-20R (all trade names, manufactured by DAICEL-ALLNEX LTD.).

<Polymerizable Compound Containing Alkylene Oxide Group Having 2 or 3 Carbon Atoms>

The polymerizable compound containing an alkylene oxide group having 2 or 3 carbon atoms which can be used for the metal-containing layer indicates a compound which contains one or more ethylene oxide groups or propylene oxide groups in one molecule and one or two or more radically polymerizable unsaturated groups at the molecular terminal.

As the polymerizable group in the polymerizable compound containing an alkylene oxide group having 2 or 3 carbon atoms, at least one organic group selected from the group consisting of an acryloyloxy group, an acryloyl group, a methacryloyloxy group, and a methacryloyl group is exemplified. Further, the acryloyloxy group is also referred to as an acryloxy group, and the methacryloyloxy group is also referred to as a methacryloxy group.

Specific examples of the polymerizable compound containing an alkylene oxide group having 2 or 3 carbon atoms include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerin triacrylate, ethoxylated glycerin trimethacrylate, ethoxylated pentaerythritol tetraacrylate, ethoxylated pentaerythritol tetramethacrylate, ethoxylated dipentaerythritol hexaacrylate, polyglycerin monoethylene oxide polyacrylate, and polyglycerin polyethylene glycol polyacrylate.

From the viewpoint of further improving the shape followability of the metal-containing layer, the number of alkylene oxide groups contained in the above-described compound is preferably in a range of 9 to 40 and more preferably in a range of 15 to 30.

The polymerizable compound containing an alkylene oxide group having 2 or 3 carbon atoms is commercially available. Specific examples of the polymerizable compound which can be contained in the metal-containing layer include NK ESTER A-200, A-400, A-600, A-1000, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, A-TMPT-9EO, ATM-4E, and ATM-35E (all trade names, manufactured by Shin-Nakamura Chemical Co., Ltd.); KAYARAD (registered trademark) DPEA-12, PEG400DA, THE-330, and RP-1040 (all trade names, manufactured by Nippon Kayaku Co., Ltd.); M-210 and M-350 (both trade names, manufactured by Toagosei Co., Ltd.); and SR-415 and SR9035 (both trade names, manufactured by Sartomer Japan Inc.).

The polymerizable compound may be used alone or in combination of two or more kinds thereof.

The average molecular weight of the polymerizable compound is preferably in a range of 200 to 3000, more preferably in a range of 250 to 2600, and particularly preferably in a range of 280 to 2200.

(Polymerization Initiator)

In a case where the metal-containing layer contains a polymerizable compound or a cured product of the polymerizable compound, it is preferable to use a polymerization initiator for curing the polymerizable compound. As the polymerization initiator, a photopolymerization initiator is preferable.

As the photopolymerization initiator, the polymerization initiators described in paragraphs 0031 to 0042 of JP2011-095716A and the oxime-based polymerization initiators described in paragraphs 0064 to 0081 of JP2015-014783A can be used.

Examples of the polymerization initiator include 1,2-octanediol-1-[4-(phenylthio)-2-(o-benzoyloxime)] (for example, IRGACURE (registered trademark) OXE-01, manufactured by BASF SE), ethan-1-one, [9-ethyl-6-(2-methylbenzoyl)-9H-carbazol-3-yl]-1-(o-acetyloxime) (for example, IRGACURE (registered trademark) OXE-02, manufactured by BASF SE), 2-(dimethylamino)-2-[(4-methylphenyl)methyl]-1-[4-(4-morpholinyl)phenyl]-1-butanone (for example, IRGACURE (registered trademark) 379EG, manufactured by BASF SE), 2-methyl-1-(4-methylthiophenyl)-2-morpholinopropan-1-one (for example, IRGACURE (registered trademark) 907, manufactured by BASF SE), 2-hydroxy-1-{4-[4-(2-hydroxy-2-methyl-propionyl)-benzyl]phenyl}-2-methyl-propan-1-one (for example, IRGACURE (registered trademark) 127, manufactured by BASF SE), 2-benzyl-2-dimethylamino-1-(4-morpholinophenyl)-butanone-1 (for example, IRGACURE (registered trademark) 369, manufactured by BASF SE), 2-hydroxy-2-methyl-1-phenyl-propan-1-one (for example, IRGACURE (registered trademark) 1173, manufactured by BASF SE), 1-hydroxy-cyclohexyl-phenyl-ketone (for example, IRGACURE (registered trademark) 184, manufactured by BASF SE), 2,2-dimethoxy-1,2-diphenylethan-1-one (for example, IRGACURE (registered trademark) 651, manufactured by BASF SE), Lunar 6 (trade name, manufactured by DKSH Management Ltd.) serving as an oxime ester-based polymerization initiator, 2,4-diethylthioxathone (for example, KAYACURE DETX-S, manufactured by Nippon Kayaku Co., Ltd.), and DFI-091 and DFI-020 (both manufactured by Daito Chemix Co., Ltd.) serving as a fluorene oxime-based polymerization initiator.

Among these, it is preferable to use initiators other than the halogen-containing polymerization initiator such as trichloromethyltriazine-based compound from the viewpoint of improving the curing sensitivity and more preferable to use an oxime-based polymerization initiator such as an α-aminoalkylphenone-based compound, an α-hydroxyalkylphenone-based compound, or an oxime ester-based compound.

The amount of the polymerization initiator to be used is preferably in a range of 1 part by mass to 15 parts by mass and more preferably in a range of 2 parts by mass to 10 parts by mass with respect to 100 parts by mass of the polymerizable compound.

(Binder Resin)

It is preferable that the metal-containing layer further contains a binder resin as a matrix component.

The metal-containing layer may contain only a binder resin as a matrix component or may contain the above-described polymerizable compound or cured product thereof and a binder resin.

In a case where the metal-containing layer contains a binder resin, the specific metal particles are more stably fixed in the metal-containing layer and the film hardness of the metal-containing layer is further improved.

The binder resin is not particularly limited and can be appropriately selected from known resins. From the viewpoint that the gloss of the metal-containing layer is unlikely to be affected, the resin is preferably a transparent resin. Specifically, a resin having a total light transmittance of 80% or greater is preferable.

The total light transmittance can be measured using a spectrophotometer (for example, spectrophotometer UV-2100, manufactured by Shimadzu Corporation).

Examples of the resin include an acrylic resin, a silicone resin, an ester resin, a urethane resin, and an olefin resin.

Further, the resin may be a polymerized compound obtained by polymerizing (curing) a polymerizable compound (monomer) described below. In a case where a resin obtained by curing a polymerizable compound is used, the hardness of the decorative film is improved.

Among these, from the viewpoint of the transparency, an acrylic resin, a silicone resin, or an ester resin is preferable, and an acrylic resin or a silicone resin is more preferable. Further, from the viewpoint of improving the transparency, an acrylic resin is still more preferable.

The weight-average molecular weight of the binder resin is preferably in a range of 10000 to 200000 and more preferably in a range of 20000 to 150000.

The weight-average molecular weight of the binder resin can be measured according to the above-described method.

In the present specification, an "acrylic resin" indicates a resin having a structural unit derived from an acrylic monomer having a (meth)acryloyl group. The concept of the (meth)acryloyl group includes a methacryloyl group and an acryloyl group and also includes an acrylic resin and a methacrylic resin.

Examples of the acrylic resin include a homopolymer of acrylic acid, a homopolymer of methacrylic acid, a homopolymer of acrylic acid ester, a homopolymer of methacrylic acid ester, a copolymer of acrylic acid and another monomer, a copolymer of methacrylic acid and another monomer, a copolymer of acrylic acid ester and another monomer, and a copolymer of methacrylic acid ester and another monomer.

Examples of the acrylic resin include a glycidyl methacrylate adduct of a copolymer of cyclohexyl methacrylate, methyl methacrylate, and methacrylic acid; a random copolymer of benzyl methacrylate and methacrylic acid; a copolymer of allyl methacrylate and methacrylic acid; and a copolymer of benzyl methacrylate, methacrylic acid, and hydroxyethyl methacrylate.

The silicone resin can be selected from known silicone resins, and examples thereof include a methyl-based straight silicone resin, a methyl phenyl-based straight silicone resin, an acrylic resin-modified silicone resin, an ester resin-modified silicone resin, an epoxy resin-modified silicone resin, an alkyd resin-modified silicone resin, and a rubber-based silicone resin.

Among these, a methyl-based straight silicone resin, a methyl phenyl-based straight silicone resin, an acrylic resin-modified silicone resin, or a rubber-based silicone resin is preferable, and a methyl-based straight silicone resin, a methyl phenyl-based straight silicone resin, or a rubber-based silicone resin is more preferable.

As the silicone resin, commercially available products may be used. Examples of the commercially available products include KR-300, KR-311, KR-251, X-40-2406M, and KR-282 (all manufactured by Shin-Etsu Chemical Co., Ltd.).

Examples of the ester resin include linear saturated polyester synthesized from aromatic dibasic acid or a derivative for forming the ester thereof and a diol or a derivative for forming the ester thereof.

Specific examples of the linear saturated polyester include polyethylene terephthalate, polyethylene isophthalate, polybutylene terephthalate, poly(1,4-cyclohexylenedimethylene terephthalate), and polyethylene-2,6-naphthalate.

The content of the binder resin in the metal-containing layer is preferably in a range of 20% by mass to 90% by mass, more preferably in a range of 30% by mass to 85% by mass, and still more preferably in a range of 35% by mass to 80% by mass with respect to the total mass of the metal-containing layer.

In a case where the content of the binder resin in the metal-containing layer is 20% by mass or greater, the binder resin is likely to function as a matrix component. In a case where the content of the binder resin in the metal-containing layer is 90% by mass or less, the gloss in the metal-containing layer is further improved.

(Combination of Polymerizable Compound or Cured Product Thereof and Binder Resin)

The metal-containing layer may contain, as a matrix component, a combination of a polymerizable compound or a cured product thereof and a binder resin. In a case of use of this combination, the content ratio between the polymerizable compound and the binder resin is preferably 0.20 or greater. In a case where the content ratio of the polymerizable compound to the binder resin is 0.20 or greater, the shape followability and the hardness of the metal-containing layer are further improved.

The content ratio between the above-described polymerizable compound and binder resin is a charging ratio at the time of preparation of a composition for forming a metal-containing layer, and the cured product of the polymerizable compound is mainly contained in the formed metal-containing layer after the exposure step is performed.

(Other Components)

The metal-containing layer may contain additives other than the above-described components as necessary.

Examples of the additives include the surfactants described in paragraph 0017 of JP4502784B and paragraphs 0060 to 0071 of JP2009-237362A, the thermal polymerization inhibitors (also referred to as polymerization inhibitors, preferably phenothiazine) described in paragraph 0018 of JP4502784B, and other additives described in paragraphs 0058 to 0071 described in JP2000-310706A.

(Total Light Reflectivity of Metal-Containing Layer)

From the viewpoint of the shielding property, the total light reflectivity of the metal-containing layer is preferably 60% or greater, more preferably 70% or greater, and still more preferably 75% or greater.

The total light reflectivity can be measured using a spectrophotometer (for example, spectrophotometer V-570, manufactured by JASCO Corporation).

(Thickness of Metal-Containing Layer)

The thickness of the metal-containing layer may be 0.5 μm or greater and more preferably 1 μm or greater.

The thickness of the metal-containing layer is preferably in a range of 0.3 μm to 30 μm, more preferably in a range of 0.5 μm to 20 μm, and still more preferably in a range of 1 μm to 20 μm.

In a case where the thickness of the metal-containing layer is 0.3 μm or greater, the gloss becomes excellent, and the concealing property is further improved. In a case where the thickness of the metal-containing layer is 20 μm or less, the gloss and the moldability become excellent.

(Formation of Metal-Containing Layer)

A method of forming the metal-containing layer is not particularly limited and can be appropriately selected depending on the purpose thereof.

A composition for forming a metal-containing layer is prepared by mixing the above-described specific metal particles, the polymerizable compound to be used together as desired, the binder resin, and other components.

The specific metal particles may be used for preparing the composition for forming a metal-containing layer in the form of a specific metal particle dispersion or specific metal particle-containing paste.

The metal-containing layer can be formed by coating one surface of the base film with the obtained composition for forming a metal-containing layer to form a composition layer for forming a metal-containing layer and drying the composition layer.

The composition layer for forming a metal-containing layer may be formed by coating the surface using a known coating device such as a dip coater, a die coater, a slit coater, a bar coater, or a gravure coater and may be formed using a Langmuir-Blodgett (LB) film method, a self-organization method, or a spray coating method.

The composition for forming a metal-containing layer can be prepared by mixing a solvent, a surfactant, and the like with the above-described components.

As the solvent which can be contained in the composition for forming a metal-containing layer, a solvent which has been typically used can be used without particular limitation. Specific examples thereof include solvents such as esters, ethers, ketones, and aromatic hydrocarbons.

Further, any of methyl ethyl ketone, propylene glycol monomethyl ether, propylene glycol monomethyl ether acetate, cyclohexanone, cyclohexanol, methyl isobutyl ketone, ethyl lactate, methyl lactate, and the like which are the same as the solvents described in paragraphs 0054 and 0055 of US2005/0282073A can be suitably used as the solvent in the composition for forming a metal-containing layer.

Among these, 1-methoxy-2-propyl acetate, methyl 3-ethoxypropionate, ethyl 3-ethoxypropionate, ethyl cellosolve acetate, ethyl lactate, butyl lactate, methyl 3-methoxypropionate, 2-heptanone, cyclohexanone, diethylene glycol monoethyl ether acetate (ethyl carbitol acetate), diethylene glycol monobutyl ether acetate (butyl carbitol acetate), propylene glycol methyl ether acetate, methyl ethyl ketone, or the like is preferably used as the solvent in the composition for forming a metal-containing layer.

These solvents may be used alone or in combination of two or more kinds thereof.

In a case where the metal-containing layer contains a polymerizable compound and a polymerization initiator as the components thereof, an exposure step may be performed because a composition layer for forming a metal-containing layer is formed and then at least a part of the polymerizable compound contained in the composition layer for forming a metal-containing layer is cured to form a cured product of the polymerizable compound. The hardness of the metal-containing layer is further improved by performing the exposure step so that at least a part of the polymerizable compound contained in the metal-containing layer is formed into a cured product.

As the exposure step, the method described in paragraphs [0035] to [0051] of JP2006-023696A can also be suitably used in the production method of the present disclosure.

The exposure step can also be performed for forming a colored layer described below in the same manner as that for forming the metal-containing layer in a case where a composition for forming a colored layer which is used for forming a colored layer described below which is optionally provided contains a polymerizable compound.

The light source for exposure can be used after being appropriately selected from light sources which can radiate light having a wavelength range (for example, 365 nm or 405 nm) in which the polymerizable compound can be cured. Specific examples thereof include an ultra-high pressure mercury lamp, a high pressure mercury lamp, and a metal halide lamp.

The exposure amount is typically in a range of 5 mJ/cm$^2$ to 200 mJ/cm$^2$ and preferably in a range of 10 mJ/cm$^2$ to 100 mJ/cm$^2$.

The metal-containing layer may be formed on at least a portion of one surface of the base film. However, from the viewpoint of effectively imparting the gloss to the decorative molded body, it is preferable that the metal-containing layer is provided on the entire one surface of the base film.

[Base Film]

As the base film in the decorative film, films formed of various materials can be used. Among these, it is preferable to use a film which is not optically distorted or a film having a high transparency.

The total light transmittance of the base film is preferably 80% or greater.

The total light transmittance can be measured according to the above-described method.

Examples of the base film include a polyethylene terephthalate (PET) film, a polyethylene naphthalate (PEN) film, an acrylic film, a polycarbonate (PC) film, a triacetyl cellulose (TAC) film, and a cycloolefin polymer (COP) film.

From the viewpoint of the transparency, it is preferable that the base film is a PET film, an acrylic film, or a PC film. Among these, a resin film containing 60% by mass or greater of an acrylonitrile/butadiene/styrene copolymer resin (ABS resin) with respect to the total amount of the resins contained in the base film is more preferable as the base film.

The content of the ABS resin is preferably 80% by mass or greater with respect to the total amount of the resins contained in the base film. The content of the ABS resin in the resins may be 100% by mass, in other words, the base film made of an ABS resin may be used.

As the base film, commercially available products may be used. Examples of the commercially available products include an acrylonitrile/butadiene/styrene copolymer resin film (thickness of 250 μm, manufactured by Okamoto Industries, Inc.), an ABS sheet (manufactured by SEKISUI SEIKEI Co., Ltd.), and COSMO SHINE (registered trademark) A4100 (PET film) (manufactured by Toyobo Co., Ltd.).

The metal-containing layer can be directly formed on one surface of the base film. Further, an optional layer having various functions may be provided on at least one surface of the base film as desired within the range not impairing the effects of the present disclosure.

Specific examples of the optional layer for imparting various functions to the base film include a scratch resistant layer, a self-repairing layer, an antistatic layer, an antifouling layer, an anti-electromagnetic wave layer, and a conductive layer.

The thickness of the base film is preferably in a range of 35 μm to 300 μm, more preferably in a range of 50 μm to 250 μm, and still more preferably in a range of 100 μm to 200 μm.

[Colored Layer]

The decorative film may include a colored layer containing a colorant other than the specific metal particles on the surface of the metal-containing layer opposite to a side where the base film is provided.

In a case where the decorative film further includes the colored layer, an optional tint can be imparted to the decorative film and the decorative molded body to be obtained using the decorative film, and complicated design can also be imparted.

(Colorant Other than Specific Metal Particles)

The colored layer contains at least one colorant other than the specific metal particles (hereinafter, also simply referred to as a "colorant").

The colorant which can be contained in the colored layer is not particularly limited and can be used after being appropriately selected from colorants for desired colors.

The colorant may be a pigment or a dye. From the viewpoint of easily realizing a deep tint, it is preferable that the colored layer contains a pigment.

As the pigment, various known inorganic pigments and organic pigments of the related art can be used.

Examples of the inorganic pigment include white pigments described in paragraphs [0015] and [0114] of JP2005-007765A.

Specific examples of the inorganic pigment include white pigments such as titanium dioxide, zinc oxide, lithopone, light calcium carbonate, white carbon, aluminum oxide, aluminum hydroxide, and barium sulfate; and black pigments such as carbon black, titanium black, titanium carbon, iron oxide, titanium oxide, and graphite. Further, the specific metal particles having metallic gloss used for the metal-containing layer described above are not included in the inorganic pigments which can be used in the colored layer.

Examples of the organic pigment include organic pigments described in paragraph [0093] of JP2009-256572A.

Specific examples of the organic pigment include red pigments such as C. I. Pigment Red 177, 179, 224, 242, 254, 255, and 264; yellow pigments such as C. I. Pigment Yellow 138, 139, 150, 180, and 185; orange pigments such as C. I. Pigment Orange 36, 38, and 71; green pigments such as C. I. Pigment Green 7, 36, and 58; blue pigments such as C. I. Pigment Blue 15:6; and purple pigments such as C. I. Pigment Violet 23.

These inorganic pigments and organic pigments may be used alone or in combination of two or more kinds thereof. Further, the inorganic pigments and organic pigments may be used in combination.

From the viewpoints of achieving both of the deep tint and the glossiness, as the pigment serving as a colorant, a pigment whose number average particle diameter of primary particles is in a range of 10 nm to 300 nm is preferable, a pigment whose number average particle diameter of primary particles is in a range of 30 nm to 270 nm is more preferable, and a pigment whose number average particle diameter of primary particles is in a range of 50 nm to 250 nm is still more preferable.

In a case where the number average particle diameter of the pigment serving as a colorant is 10 nm or greater, a deep tint is more likely to be realized. Further, in a case where the number average particle diameter of the pigment is 300 nm or less, the gloss is further improved.

As the number average particle diameter of primary particles of the pigment in the present specification, a value obtained by calculating the diameters (equivalent circle diameters) of 100 particles in a case where the electron micrograph images of the pigment particles are formed into circles having the same areas and arithmetically averaging the equivalent circle diameters of 100 particles is employed.

As the colorant, a pigment (hereinafter, also referred to as a bright pigment) having a light-transmitting property and a light reflectivity may be used.

Examples of the bright pigment include mica, glass, titanium oxide-coated mica (titanium mica), titanium oxide-coated glass, titanium oxide-coated talc, iron oxide-coated mica, a pearl pigment, and bismuth pearl. Further, a pigment in which a plurality of coated layers of titanium oxide are laminated, a pigment in which a coated layer of silicon oxide is laminated on a coated layer of titanium oxide, and the like are also exemplified.

Examples of the mica pigment include TWINCLE-PEARL Series, ULTIMICA Series, and PEARL-GLAZE Series (all manufactured by Nihon Koken Kogyo Co., Ltd.), and MicaBased Series and fluorphlogophiteBased (both manufactured by Sandream Impact LLC). Examples of the glass pigment include METASHINE Series (manufactured by Nippon Sheet Glass Co., Ltd.) and GlassBased Series (manufactured by Sandream Impact LLC).

The content of the colorant in the colored layer is preferably in a range of 1% by mass to 60% by mass, more preferably in a range of 5% by mass to 55% by mass, and still more preferably in a range of 10% by mass to 50% by mass with respect to the total mass of the colored layer.

In a case where the content of the colorant in the colored layer is 1% by mass or greater, a deep tint in the design to be imparted by the colored layer is likely to be realized. Meanwhile, in a case where the content of the colorant is 60% by mass or less, the gloss resulting from the metal-containing layer is further improved.

(Other Components in Colored Layer)

It is preferable that the colored layer contains a component functioning as a matrix so as to be a stable layer containing a colorant. Examples of the component functioning as a matrix include a polymerizable compound or a cured product thereof and a binder resin. Among these, it is preferable that the colored layer contains a polymerizable compound or a cured product thereof.

As a polymerizable compound or a cured product thereof and a binder resin which can be contained in the colored layer, the polymerizable compound or the cured product thereof and the binder resin which can be contained in the above-described metal-containing layer are exemplified, and the preferred examples thereof are the same as described above.

From the viewpoint of preventing degradation of the gloss resulting from the metal-containing layer, it is preferable that a polymerizable compound or a cured product thereof and a binder resin which are capable of forming a transparent layer is selected as the polymerizable compound or the cured product thereof and the binder resin to be contained in the colored layer.

(Thickness of Colored Layer)

The thickness of the colored layer to be provided as desired is preferably 5 µm or greater.

The thickness of the colored layer is preferably in a range of 2 µm to 60 µm, more preferably in a range of 4 µm to 60 µm, and still more preferably in a range of 5 µm to 50 µm.

In a case where the thickness of the colored layer is 5 µm or greater, a deep tint is likely to be obtained and the designability is further improved. In a case where the thickness of the colored layer is 50 µm or less, the gloss resulting from the metal-containing layer is unlikely to be degraded.

(Light Transmittance of Colored Layer)

The light transmittance of the colored layer is preferably in a range of 3% to 30% in terms of the total light transmittance.

The total light transmittance can be measured according to the above-described method.

In a case where the total light transmittance of the colored layer is 3% or greater, a deep tint is likely to be obtained and the gloss of the metal-containing layer is unlikely to be decreased.

(Formation of Colored Layer)

A method of forming the colored layer is not particularly limited and can be appropriately selected depending on the purpose thereof. Examples of the method of forming the colored layer include the same formation methods for the metal-containing layer as described above.

In other words, in a case where the colored layer is formed according to the coating method, a composition for forming a colored layer is prepared by mixing the above-described colorant, resin, and each component to be combined as desired. Further, in a case where a pigment is used as the colorant, the pigment may be used together with a pigment particle dispersant or the pigment may be used for preparing a composition for forming a colored layer as a pigment particle dispersion. The dispersant may be appropriately selected from known dispersants suitable for the kind of the pigment to be used, similar to the specific metal particles, and then used.

The surface of the metal-containing layer opposite to a side where the base film is provided is coated with the obtained composition for forming a colored layer to form a composition layer for forming a colored layer, and the composition layer is dried, thereby forming a colored layer.

In a case where the colored layer is provided on the entire surface of the metal-containing layer, the composition layer for forming a colored layer may be formed by coating the surface using a known coating device such as a dip coater, a die coater, a slit coater, a bar coater, or a gravure coater and may be formed using a Langmuir-Blodgett (LB) film method, a self-organization method, or a spray coating method.

In a case where the colored layer is formed on a part of the surface of the metal-containing layer, the composition for forming a colored layer may be formed according to a printing method such as screen printing, offset printing, or ink jet printing. From the viewpoint of easily forming a colored layer having a large thickness, a screen printing method is preferable.

In the case where the colored layer is formed on a part of the surface of the metal-containing layer, a design can be formed depending on the purpose thereof. Examples thereof include a form in which the colored layer is continuously formed only in a partial region on the surface of the metal-containing layer, a form in which the colored layer is formed on the entire surface of the metal-containing layer such that a pattern such as a stripe, a dot, an indeterminate shape, or the like is repeatedly formed, and a form in which characters, specific figures, or the like are formed on a part of the surface of the metal-containing layer.

Further, as a preferable form of the colored layer, a form in which the colored layer contains a polymerizable compound or a cured product thereof is exemplified. In a case where the colored layer contains a polymerizable compound or a cured product thereof, as a method for forming the colored layer, a method of performing an exposure step after a composition layer for forming a colored layer is formed is preferable as described in the method of forming the metal-containing layer.

In a case where the colored layer is formed according to a transfer method, a method of transferring a film for forming a colored layer formed of the composition for forming a colored layer onto the metal-containing layer according to a method of the related art may be employed.

It is preferable that the colored layer is directly formed on the surface of the metal-containing layer.

As described below, in the decorative film according to the embodiment of the present disclosure, an optional layer other than the colored layer may be provided in addition to the base film, the metal-containing layer, and the colored layer to be comprised as desired. However, for example, in a case where the colored layer is provided on the surface of the metal-containing layer through an adhesive layer, since the adhesive layer having a different refractive index is provided therebetween, the light reflected on the metal-containing layer is refracted before reaching the colored layer, and thus a desired deep tint is unlikely to be obtained. Therefore, from the viewpoint that the designability due to the functions of the metal-containing layer and the colored layer is effectively exhibited, it is preferable that any layer is not provided between the metal-containing layer and the colored layer and the colored layer is directly provided on the surface of the metal-containing layer.

[Layer Configuration of Decorative Film]

The layer configuration of the decorative film will be described with reference to FIG. 1. FIG. 1 is a schematic cross-sectional view illustrating the layer configuration of the decorative film according to an embodiment of the present disclosure. A decorative film 10 includes a base film 12, a metal-containing layer 14 on one surface of the base film 12, and a transparent film 16 on a surface of the metal-containing layer 14. The transparent film 16 is an optional layer comprised as desired.

Figure 2:
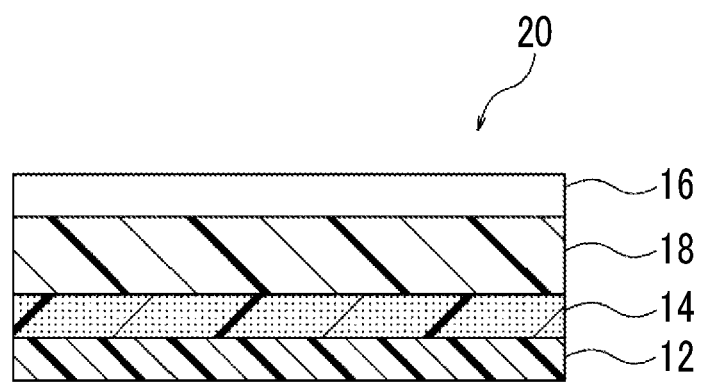
FIG. 2 is a schematic cross-sectional view illustrating a layer configuration of a decorative film according to another embodiment of the present invention.

FIG. 2 is a schematic cross-sectional view illustrating the layer configuration of the decorative film according to another embodiment of the present disclosure. A decorative film 10 includes the base film 12 and the metal-containing layer 14 on one surface of the base film 12, and may include a colored layer 18 on a surface of the metal-containing layer 14 opposite to a side where the base film 12 is provided as illustrated in FIG. 2. The decorative film 20 illustrated in FIG. 2 includes: the metal-containing layer 14 on one surface of the base film 12; and the colored layer 18 and the transparent film 16 on the surface of the metal-containing layer 14 in this order. The colored layer 18 and the transparent film 16 are optional layers comprised as desired.

(Optional Layer)

The decorative film may include layers, as desired, other than the metal-containing layer and the colored layer described above on the base film as long as the effects in the present disclosure are not impaired.

Examples of the optional layer include a transparent film, an adhesive layer, and a layer for imparting various functions to the base film described above.

(Transparent Film)

From the viewpoints of protecting the surface of the decorative film and further improving the scratch resistance of the decorative film, it is preferable that the decorative film includes a transparent film on a surface of the metal-containing layer opposite to a side where the base film is provided or on a surface of the colored layer provided on the surface of the metal-containing layer as desired.

The transparent film which can be used as the above-described transparent film is not particularly limited as long as the transparent film has a required hardness and scratch resistance.

The term "transparent" in the transparent film indicates that the total light transmittance is 85% or greater. The total light transmittance of the transparent film can be measured according to the above-described method.

As the transparent film, a film obtained by forming a film using a transparent resin is preferable, and examples thereof include a PET film, a PEN film, an acrylic film, a PC film, a TAC film, and a COP film. Among these, an acrylic film is preferable.

Further, the thickness of the transparent film is preferably in a range of 50 μm to 150 μm.

As the transparent film, a commercially available product may be used, and examples of the commercially available product include ACRYPRENE (registered trademark) HBS010 (acrylic resin film, manufactured by Mitsubishi Rayon Co., Ltd.), TECHNOLLOY (registered trademark) S001G (acrylic resin film, manufactured by Sumitomo Chemical Co., Ltd.), C000 (polycarbonate resin film, manufactured by Sumitomo Chemical Co., Ltd.), and C001 (acrylic resin/polycarbonate resin-laminated film, manufactured by Sumitomo Chemical Co., Ltd.).

The total thickness of the decorative film is preferably in a range of 50 μm to 600 μm and more preferably in a range of 100 μm to 500 μm.

Excellent gloss can be imparted to a surface of a decorative molded body by disposing the decorative film according to the embodiment of the present disclosure on a molded base material at the time of formation of the decorative molded body.

From the viewpoint of the shielding property, the optical density of the decorative film is preferably in a range of 2.5 to 6.0 and more preferably in a range of 3.0 to 5.5.

The optical density can be measured using, for example, a transmission densitometer such as BMT-1 (manufactured by Sakata Inx Corporation).

(Method of Producing Decorative Film)

A method of producing the decorative film includes a step of coating the base film with the composition for forming a metal-containing layer and drying the composition to form a metal-containing layer.

Further, in a case of providing a colored layer, the method of producing the decorative film may further include a step of applying the composition for forming a colored layer to the surface of the obtained metal-containing layer to form a colored layer.

The details of the formation methods in the step of forming the metal-containing layer and the step of forming the colored layer according to the method of producing the decorative film are as described above.

<Decorative Molded Body>

The decorative molded body according to the embodiment of the present disclosure is a decorative molded body comprising the above-described decorative film according to the embodiment of the present disclosure, on the molded base material.

The decorative film and the molded base material may be in direct contact with each other or may be provided by interposing an adhesive layer therebetween.

Since the decorative molded body according to the embodiment of the present disclosure comprises the above-described decorative film according to the embodiment of the present disclosure, the gloss is excellent. Further, the moldability of the decorative film is excellent. Therefore, the decorative molded body can be formed into a complicated shape such as a shape with fine or deep unevenness, excellent gloss of the obtained decorative molded body is not damaged, and the designability of the appearance is excellent.

(Molded Base Material)

A resin base material is used as the molded base material. Examples of the resin which can be used as a molded material include an acrylic resin, a silicone resin, an ester resin, a urethane resin, and an olefin resin.

(Adhesive Layer)

The decorative film may be disposed on the molded base material through an adhesive layer at the time of formation of the decorative molded body.

An adhesive for forming the adhesive layer can be appropriately selected from known adhesives. Specific examples thereof include adhesives containing a vinyl chloride/vinyl acetate copolymer and an acrylic resin.

As the adhesive, a commercially available product may be used, and examples of the commercially available product include IMB-003 (manufactured by Teikoku Printing Inks Mfg. Co., Ltd.).

<Method of Producing Decorative Molded Body>

A method of producing the decorative molded body includes a step of fixing the decorative film according to the embodiment of the present disclosure to the molded base material.

Further, the method of producing the decorative molded body may include a finishing step of finishing the obtained decorative molded body as a step other than the step of fixing the decorative film according to the embodiment of the present disclosure to the molded base material.

Hereinafter, the method of producing the decorative molded body will be described in detail. Here, the description will be made using a case where the decorative film and the resin molded body are fixed by insert molding as an example.

Even in a case where the metal-containing layer contains specific metal particles, has excellent moldability, and is suitable for a molded body having deep and complicated unevenness, since the metal-containing layer follows the deformation of the decorative film, the above-described decorative film according to the embodiment of the present disclosure is suitable for insert molding.

A decorative molded body in which the decorative film is bonded to the surface thereof can be produced by performing a step of disposing a decorative film formed to have a quadrangular shape with a certain dimension in a mold for injection molding and performing mold clamping; a step of injecting a molten resin into the mold; and a step of taking out the injected resin after solidification of the injected resin. Hereinafter, the method of producing the decorative molded body will be described based on the example of the production method including the above-described steps.

Since the decorative film is molded into a three-dimensional shape by performing the above-described steps, a decorative molded body having a three-dimensional shape, to which the deep tint and the glossiness of the decorative film have been imparted, is prepared.

The mold (that is, a molding mold) for injection molding used for producing the decorative molded body comprises a mold (that is, a male mold) having a shape of a projection and a mold (that is, a female mold) having a shape of a depression corresponding to the shape of the projection, and the mold clamping is performed after the decorative film is disposed on the molding surface which is the inner peripheral surface of the female mold.

Here, before the decorative film is disposed in the molding mold, the decorative film can be supplied to the molding mold after a three-dimensional shape is imparted to the decorative film in advance by molding (preforming) the decorative film using the molding mold.

Further, at the time of disposition of the decorative film in the molding mold, the positioning of the decorative film and the molding mold needs to be carried out in a state in which the decorative film is inserted into the molding mold.

As a method of performing positioning of the decorative film and the molding mold in the state in which the decorative film is inserted into the molding mold, a method of inserting a fixing pin included in a male mold into a positioning hole included in a female mold and holding the state may be exemplified.

Here, the positioning hole is formed in advance at an end portion (a position where the three-dimensional shape has not been imparted after molding) of the decorative film in the female mold.

Further, the fixing pin is formed in advance at a position where the fixing pin fits with the positioning hole in the male mold.

Further, as the method of performing positioning of the decorative film and the molding mold in the state in which the decorative film is inserted into the molding mold, the following method can be used in addition to the method of inserting a fixing pin into a positioning hole.

Further, a method of performing fine adjustment and alignment by drive of a transport device side of the decorative film targeting a positioning mark which is preliminarily made on the position in the decorative film where the three-dimensional shape has not been imparted after molding is exemplified. In this case of the method, it is preferable that the positioning mark is recognized at two or more diagonal points at the time of being viewed from a product part of an injection molded article (decorative molded body).

After the decorative film and the molding mold are positioned and the molding mold is subjected to mold clamping, the molten resin is injected into the molding mold into which the decorative film has been inserted. At the time of injection, the molten resin is injected to the metal-containing layer side of the decorative film.

The temperature of the molten resin to be injected into the molding mold is set according to the physical properties of the resin to be used. For example, in a case where the resin to be used is an acrylic resin, it is preferable that the temperature of the molten resin is set to be in a range of 240° C. to 260° C.

Further, the position of an inlet (injection port) of the male mold may be set according to the shape of the molding mold or the type of the molten resin for the purpose of suppressing abnormal deformation of the decorative film due to the heat or gas generated at the time of injection of the molten resin into the molding mold.

After the molten resin injected to the molding mold into which the decorative film has been inserted is solidified, the molding mold is subjected to mold clamping, and an intermediate decorative molded body in which the decorative film has been fixed to the molded base material which is the solidified molten resin is taken out from the molding mold.

In the intermediate decorative molded body, a burr is integrated with a dummy portion of the decorative molded body around the decorative portion which becomes a final product (decorative molded body). Here, an insertion hole formed by insertion of the fixing pin in the above-described positioning is present in the dummy portion.

Therefore, the decorative molded body according to the embodiment of the present disclosure can be obtained by performing a finishing process of partially removing the bur and the dummy portion from the decorative portion in the intermediate decorative molded body before the finishing process.

[Layer Configuration of Decorative Molded Body]

Figure 3:
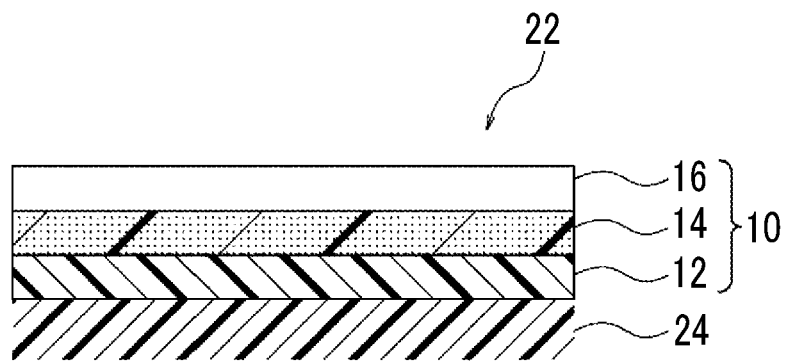
FIG. 3 is a schematic cross-sectional view illustrating a layer configuration of a decorative molded body according to an embodiment of the present invention.

The layer configuration of the decorative molded body will be described in detail with reference to FIG. 3. FIG. 3 is a schematic cross-sectional view illustrating the layer configuration of the decorative molded body according to the embodiment of the present disclosure. A decorative molded body 22 is a molded body obtained by disposing the above-described decorative film 10 according to the embodiment of the present disclosure on a surface of a molded base material 24. In other words, the decorative molded body having the decorative film 10 on the surface of the molded base material 24 which has been molded is formed such that the decorative film 10 is disposed on the surface of the molded base material 24 in order of the base film 12, the metal-containing layer 14, and the transparent film 16 from the molded base material 24 side. Further, in the embodiment described in FIG. 3, the decorative film 10 comprised in the decorative molded body 22 includes the transparent film 16 which is an optional layer.

The decorative molded body according to the embodiment of the present disclosure is a decorative molded body which can be molded into an optional shape and has excellent designability with a deep tint and gloss, and can be applied to various fields of resin molded bodies.

Further, since the decorative molded body according to the embodiment of the present disclosure comprises the above-described decorative film according to the embodiment of the present disclosure on the surface thereof, the decorative film satisfactorily follows the shape of the mold during molding even in a case of an abnormal form obtained by placing a complicated uneven shape, and degradation of the concealing property due to occurrence of cracks in the metal-containing layer is suppressed so that an excellent appearance is achieved.

EXAMPLES

Hereinafter, the present invention will be described in more detail based on the examples. The scope of the present invention is not limited to the specific examples described below. Further, "parts" are on a mass basis unless otherwise specified.

Examples 1 to 20

<Preparation of Composition for Forming Decorative Film>
[Preparation of Composition for Forming Metal-Containing Layer]

Compositions (coating solutions 1 to 13) for forming a metal-containing layer with the compositions listed in Table 1 shown below were prepared.

The numerical values in Table 1 each indicate parts by mass of each component with respect to the total mass of each coating solution, and "-" indicates that the corresponding component is not contained.

TABLE 1

| | Coating solution 1 | Coating solution 2 | Coating solution 3 | Coating solution 4 | Coating solution 5 | Coating solution 6 | Coating solution 7 |
|---|---|---|---|---|---|---|---|
| Silver pigment dispersion liquid | 360.0 | 360.0 | 360.0 | 360.0 | 360.0 | 360.0 | 360.0 |
| Binder resin 1 | 189.2 | 159.2 | 137.4 | — | 233.3 | 264.0 | 189.2 |
| Binder resin 2 | — | — | — | — | — | — | — |
| Polymerizable compound 1 | 46.0 | 58.0 | 66.8 | 121.8 | 28.4 | 16.0 | — |
| Polymerizable compound 2 | — | — | — | — | — | — | 46.0 |
| Polymerizable compound 3 | — | — | — | — | — | — | — |
| Polymerizable compound 4 | — | — | — | — | — | — | — |
| Polymerizable compound 5 | — | — | — | — | — | — | — |
| Polymerizable compound 6 | — | — | — | — | — | — | — |
| Polymerization initiator | 0.5 | 0.7 | 0.8 | 1.4 | 0.3 | 0.2 | 0.5 |
| Surfactant | 0.5 | 0.5 | 0.5 | 0.5 | 0.5 | 0.5 | 0.5 |
| Organic solvent 1 | 393.6 | 393.6 | 393.6 | 377.5 | 359.3 | 335.4 | 393.6 |
| Organic solvent 2 | 10.2 | 28.1 | 41.0 | 138.8 | 18.3 | 23.8 | 10.2 |
| Total | 1000.0 | 1000.0 | 1000.0 | 1000.0 | 1000.0 | 1000.0 | 1000.0 |
| Polymerizable compound/binder resin (content ratio) | 0.61 | 0.91 | 1.22 | — | 0.30 | 0.15 | 0.61 |

(parts by mass)

| | Coating solution 8 | Coating solution 9 | Coating solution 10 | Coating solution 11 | Coating solution 12 | Coating solution 13 |
|---|---|---|---|---|---|---|
| Silver pigment dispersion liquid | 360.0 | 360.0 | 360.0 | 360.0 | 360.0 | 360.0 |
| Binder resin 1 | 189.2 | 189.2 | 189.2 | 189.2 | — | 304.1 |
| Binder resin 2 | — | — | — | — | 189.2 | — |
| Polymerizable compound 1 | — | — | — | — | 46.0 | — |
| Polymerizable compound 2 | — | — | — | — | — | — |
| Polymerizable compound 3 | 46.0 | — | — | — | — | — |

TABLE 1-continued

|  |  |  |  |  |  |  |
|---|---|---|---|---|---|---|
| Polymerizable compound 4 | — | 46.0 | — | — | — | — |
| Polymerizable compound 5 | — | — | 46.0 | — | — | — |
| Polymerizable compound 6 | — | — | — | 46.0 | — | — |
| Polymerization initiator | 0.5 | 0.5 | 0.5 | 0.5 | 0.5 | — |
| Surfactant | 0.5 | 0.5 | 0.5 | 0.5 | 0.5 | 0.5 |
| Organic solvent 1 | 393.6 | 393.6 | 393.6 | 393.6 | 393.6 | 335.4 |
| Organic solvent 2 | 10.2 | 10.2 | 10.2 | 10.2 | 10.2 | — |
| Total | 1000.0 | 1000.0 | 1000.0 | 1000.0 | 1000.0 | 1000.0 |
| Polymerizable compound/binder resin (content ratio) | 0.61 | 0.61 | 0.61 | 0.61 | 0.61 | 0.00 |

The details of each component used in Table 1 are as follows.

Silver pigment dispersion liquid: SF Silver AF4359 (trade name) manufactured by Sanyo Color Works, Ltd., composition ((aluminum particles): 15.0% by mass, dispersion assistant: 0.75% by mass, dispersion solvent (1-methoxy-2-propyl acetate): 84.25% by mass)

Further, an excess amount of 1-methoxy-2-propyl acetate was added to the silver pigment dispersion liquid so that aluminum particles contained in the dispersion liquid were deposited, and the particle diameter and the thickness of the obtained aluminum particles were measured based on an observation image obtained using TEM according to the above-described method. As the result, it was confirmed that the aluminum particles were tabular metal particles whose average major axis diameter was 20 μm, thickness was 0.2 μm, and aspect ratio was 100.

Binder resin 1: 40 mass % 1-methoxy-2-propyl acetate solution containing copolymer (weight-average molecular weight Mw of 29000) of benzyl methacrylate and methacrylic acid (molar ratio of 70/30)

Binder resin 2: COATRON KYU-1 (urethane resin, 40 mass % propylene glycol monomethyl ether/isopropanol solution, manufactured by DIC Corporation)

Polymerizable compound 1: CN-996NS (solid content of 100% by mass), manufactured by Sartomer Japan Inc., urethane acrylate oligomer Polymerizable compound 2: SR-415 (solid content of 100% by mass), manufactured by Sartomer Japan Inc., ethylene oxide (EO) chain-containing monomer (containing 20 equivalents of EO chains)

Polymerizable compound 3: SR-9035 (solid content of 100% by mass), manufactured by Sartomer Japan Inc., ethylene oxide chain-containing monomer (containing 15 equivalents of EO chains)

Polymerizable compound 4: A-GLY-9E (solid content of 100% by mass), manufactured by Shin-Nakamura Chemical Co., Ltd., ethylene oxide chain-containing monomer (containing 9 equivalents of EO chains)

Polymerizable compound 5: A-DPH (solid content of 100% by mass), manufactured by Shin-Nakamura Chemical Co., Ltd.

Polymerizable compound 6: A-DCP (solid content of 100% by mass), manufactured by Shin-Nakamura Chemical Co., Ltd.

Polymerization initiator: OXE-02 (ethanone, 1-[9-ethyl-6-(2-methylbenzoyl)-9H-carbazol-3-yl]1-(o-acetyloxime)), manufactured by BASF SE Surfactant: MEGAFACE (registered trademark) F-551, manufactured by DIC Corporation, methyl isobutyl ketone solution containing perfluoroalkyl group-containing phosphoric acid ester type amine neutralized product (solid content of 30% by mass)

Organic solvent 1: methyl ethyl ketone

Organic solvent 2: propylene glycol monomethyl ether acetate

[Preparation of Composition for Forming Colored Layer]

A composition (coating solution 14) for forming a colored layer with the composition listed in Table 2 shown below was prepared.

TABLE 2

|  | (parts by mass) Coating solution 14 |
|---|---|
| Red pigment dispersion liquid | 671.1 |
| Acrylic resin | 133.2 |
| Polymerizable compound 1 | 63.3 |
| Polymerization initiator | 0.7 |
| Surfactant | 7.3 |
| Organic solvent 1 | 124.4 |
| Total | 1000.0 |

The details of each component listed in Table 2 are as follows. Further, the acrylic resin, the polymerizable compound 1, the polymerization initiator, the surfactant, and the organic solvent 1 are the same as the components used for forming the metal-containing layer as described above.

Red pigment dispersion liquid: SF RED GC1323, (trade name) manufactured by Sanyo Color Works, Ltd., composition (red pigment: 12.0% by mass, dispersion resin: 5.4% by mass, dispersion assistant: 4.8% by mass, dispersion solvent (propylene glycol monomethyl ether acetate): 73.8% by mass, dispersion solvent (propylene glycol monomethyl ether): 4.0% by mass)

<Preparation of Decorative Film>

—Preparation of Base Film—

An ABS film (thickness of 250 μm, manufactured by Okamoto Industries, Inc.) was prepared as the base film.

—Preparation of Protective Film—

Next, GF-8 (polyethylene film having a thickness of 35 μm, manufactured by Tamapoly Co., Ltd.) was prepared as the protective film.

[Formation of Colored Layer and Metal-Containing Layer on Surface of Base Film]

In Examples 1 to 18, one surface of the base film was coated with each of the coating solutions 1 to 13 serving as the compositions for forming a metal-containing layer listed in Table 1 in an amount set such that the thickness (the thickness after the surface was dried) listed in Table 3 was obtained using an extrusion coater to form each composition layer for forming a metal-containing layer, and the composition layer was dried to form a metal-containing layer.

In Example 19 and Example 20, the composition (coating solution 14) for forming a colored layer listed in Table 2 was applied to a surface of the metal-containing layer formed to have the thickness listed in Table 3 to form a composition layer for forming a colored layer, and the composition layer was dried to form a colored layer.

Further, in Examples 1 to 18, the metal-containing layer was laminated on the base film, and the protective film prepared in the above-described manner was pressure-bonded to the outermost layer, in other words, the surface of the metal-containing layer opposite to a side where the base film was provided.

Further, in Examples 19 and 20, the metal-containing layer and the colored layer sequentially laminated on the base film, and the protective film prepared in the above-described manner was pressure-bonded to the outermost layer, in other words, the surface of the colored layer opposite to a side where the metal-containing layer was provided.

(Exposure)

Thereafter, ACRYPRENE HBS010 (acrylic resin film having a thickness of 125 μm, manufactured by Mitsubishi Rayon Co., Ltd.) was laminated on the base film having metal-containing layer and the colored layer from which the protective film had been removed. The lamination was performed by setting the temperature of the acrylic resin film as a transparent film to 90° C., the linear pressure thereof to 100 N/cm, and the transport speed thereof to 0.1 m/min.

In Examples 1 to 17, Example 19, and Example 20, after the acrylic resin film was laminated, the distance between the exposure light source and the acrylic resin film in the base film was set to 200 μm and the entire surface was exposed to the light source with an exposure amount of 150 mJ/cm$^2$ (i-line). In Example 18, the exposure treatment was not performed.

Each of the decorative films of Examples 1 to 20 including the acrylic resin film (transparent film), the metal-containing layer, and the base film; or the acrylic resin film, the colored layer, the metal-containing layer, and the base film in this order was prepared in the above-described manner.

Comparative Example 1

The same ABS film (thickness of 250 μm, manufactured by Okamoto Industries, Inc.) as the base film in Example 1 was set on a commercially available vapor deposition device ("NS-1875-Z" (product name), manufactured by Nishiyama-Seisakusho Co., Ltd.) to obtain a base film having an aluminum vapor deposition layer serving as a metal vapor deposition layer with a thickness of 45 nm. In the present embodiment, the metal vapor deposition layer functions as the metal-containing layer.

ACRYPRENE HBS010 which was the same acrylic resin film as the transparent film used in Example 1 was prepared, and a dry laminate adhesive (SEIKA BOND (manufactured by Dainichiseika Color & Chemicals Mfg. Co., Ltd.):CAT-RT65 (manufactured by Tokyo Ink Co., Ltd.):ethyl acetate=100:10:200) to which a curing agent was added was prepared with the acrylic resin film.

The surface of the metal vapor deposition layer of the obtained aluminum vapor deposition film was coated with the obtained dry laminate adhesive in an amount set such that the thickness after the surface was dried reached 5 μm according to a wire bar method, the acrylic resin film was brought into close contact with the surface of the dry laminate adhesive after the surface was dried, and dry lamination was performed under the above-described conditions.

In the above-described manner, a decorative film of Comparative Example 1, including the metal-containing layer formed on the base film through metal vapor deposition and the transparent acrylic resin film was obtained.

TABLE 3

| | Decorative film | | | | Evaluation of decorative molded body |
|---|---|---|---|---|---|
| | Metal-containing layer | | Colored layer | | |
| | Coating solution | Thickness | Coating solution | Thickness | Tint of appearance |
| Example 1 | Coating solution 1 | 10 μm | Not available | | Silver |
| Example 2 | Coating solution 2 | 10 μm | Not available | | Silver |
| Example 3 | Coating solution 3 | 10 μm | Not available | | Silver |
| Example 4 | Coating solution 4 | 10 μm | Not available | | Silver |
| Example 5 | Coating solution 5 | 10 μm | Not available | | Silver |
| Example 6 | Coating solution 6 | 10 μm | Not available | | Silver |
| Example 7 | Coating solution 7 | 10 μm | Not available | | Silver |
| Example 8 | Coating solution 8 | 10 μm | Not available | | Silver |
| Example 9 | Coating solution 9 | 10 μm | Not available | | Silver |
| Example 10 | Coating solution 10 | 10 μm | Not available | | Silver |
| Example 11 | Coating solution 11 | 10 μm | Not available | | Silver |
| Example 12 | Coating solution 12 | 10 μm | Not available | | Silver |
| Example 13 | Coating solution 13 | 10 μm | Not available | | Silver |
| Example 14 | Coating solution 2 | 0.5 μm | Not available | | Silver |
| Example 15 | Coating solution 2 | 1.0 μm | Not available | | Silver |
| Example 16 | Coating solution 2 | 3.0 μm | Not available | | Silver |
| Example 17 | Coating solution 2 | 20 μm | Not available | | Silver |
| Example 18 | Coating solution 1 (exposure treatment was not performed) | 10 μm | Not available | | Silver |
| Example 19 | Coating solution 2 | 10 μm | Coating solution 14 | 20 um | Red |
| Example 20 | Coating solution 2 | 10 μm | Coating solution 14 | 40 um | Red |
| Comparative Example 1 | (Metal vapor deposition layer) | (45 nm) | Not available | | Silver |

TABLE 3-continued

|  | Evaluation of decorative molded body | | |
| --- | --- | --- | --- |
|  | Glossiness | Three-dimensional moldability Limit spherical shape (mm) | Lamination properties of transparent resin |
| Example 1 | A | 40 | A |
| Example 2 | A | 40 | A |
| Example 3 | A | 30 | B |
| Example 4 | A | 20 | C |
| Example 5 | A | 50 | A |
| Example 6 | A | 60 | B |
| Example 7 | A | 50 | A |
| Example 8 | A | 60 | A |
| Example 9 | A | 70 | A |
| Example 10 | A | 70 | A |
| Example 11 | A | 70 | A |
| Example 12 | A | 30 | B |
| Example 13 | A | 70 | C |
| Example 14 | B | 60 | B |
| Example 15 | A | 50 | A |
| Example 16 | A | 40 | A |
| Example 17 | A | 40 | A |
| Example 18 | A | 40 | A |
| Example 19 | A | 40 | A |
| Example 20 | A | 40 | A |
| Comparative Example 1 | C | 100 | C |

<Evaluation>

The obtained decorative films of each example and each comparative example were evaluated as follows. The evaluation results are listed in Table 3.

[Evaluation of Glossiness]

The sensory evaluation of the glossiness (visibility of gloss and reflected light) of each decorative film of each example and each comparative example was performed based on the following standards.

Further, in the evaluation standards described below, A and B are preferable and A is more preferable as the evaluation of the glossiness.

(Glossiness)

A: Excellent gloss resulting from strong reflection was seen even at the time of being visually recognized at any angle.

B: Gloss resulting from reflection was seen even at the time of being visually recognized at any angle.

C: Excellent gloss resulting from strong reflection was seen in the regular reflection direction with respect to the light source, but gloss resulting from reflection was unlikely to be seen even at the time of being observed at any angle other than the regular reflection direction.

<Evaluation of Three-Dimensional Moldability>

Hemispherical molds having diameters at intervals of 10 mm between 10 mm and 200 mm were prepared.

Using the molds, the obtained decorative film was vacuum-molded to have a hemispherical shape at a heating temperature of 110° C., and the minimum diameter of the mold having a surface in which cracks occurred was used as an index of the three-dimensional moldability. Further, it is evaluated that the three-dimensional moldability is excellent in a case where cracks do not occur in the surface with a smaller diameter. There is no problem in practical use in a case where the diameter is 70 mm or less, and the diameter is preferably 60 mm or less and more preferably 50 mm or less.

[Evaluation of Lamination Properties of Transparent Resin]

Bubbles (lamination foam) generated at the time of lamination of the acrylic resin film serving as a transparent film on the obtained decorative film of each example and each comparative example were evaluated through visual observation. In a case where bubbles were generated at the time of lamination, the surface of the decorative film became uneven, and the appearance and the gloss were degraded, which is not preferable.

A: Generation of bubbles caused by lamination was not visually recognized.

B: Extremely small bubbles having a diameter of less than 1 mm were visually recognized in a plan view.

C: Multiple bubbles having a diameter of 1 mm or greater were visually recognized in a plan view.

Based on the results listed in Table 3, it was found that the decorative film of each example had excellent gloss and excellent moldability.

Among these, in the decorative film of each example in which the content ratio of the polymerizable compound was in a range of 0.2 to 1.0, it was found that generation of bubbles at the time of lamination of transparent film was effectively suppressed, and an additional effect of an excellent thermal lamination property of the transparent film was exhibited.

Meanwhile, it was found that the decorative film of Comparative Example 1 which had the metal vapor deposition layer was not suitable for forming a molded body having a complicated shape because the intensity of reflection was observed depending on the viewing angle, the texture was poor from the viewpoint of the gloss, and the three-dimensional moldability was deteriorated.

The entirety of the disclosure of JP2016-244934 filed on Dec. 18, 2016 is incorporated in the present specification by reference.

All documents, patent applications, and technical standards described in the present specification are incorporated herein by reference to the same extent as in a case of being specifically and individually noted that individual documents, patent applications, and technical standards are incorporated by reference.

EXPLANATION OF REFERENCES 10, 20: decorative film
12: base film
14: metal-containing layer
16: transparent film
18: colored layer
22: decorative molded body
24: molded base material

What is claimed is:

1. A decorative film comprising:
a base film; and
a metal-containing layer which contains tabular metal particles, on one surface of the base film,
wherein the metal-containing layer further contains a binder resin and at least one of a polymerizable compound containing a radically polymerizable unsaturated group or a cured product of the polymerizable compound containing a radically polymerizable unsaturated group, and
wherein the polymerizable compound contains at least one selected from the group consisting of a polymerizable compound containing at least five ethylenically unsaturated groups, a urethane (meth)acrylate compound, ethoxylated bisphenol A diacrylate, tricyclodecanediol di(meth)acrylate and a polymerizable compound containing an alkylene oxide group having 2 or 3 carbon atoms.

2. The decorative film according to claim 1, wherein the thickness of the metal-containing layer is 1 μm or greater.

3. The decorative film according to claim 1, further comprising:
a colored layer which contains a colorant other than the tabular metal particles on a surface of the metal-containing layer opposite to a side where the base film is provided.

4. The decorative film according to claim 3,
wherein the colored layer further contains at least one selected from a polymerizable compound containing a radically polymerizable unsaturated group or a cured product of the polymerizable compound containing a radically polymerizable unsaturated group.

5. The decorative film according to claim 1,
wherein the base film contains 60% by mass or greater of an acrylonitrile/butadiene/styrene copolymer resin with respect to a total amount of the resin contained in the base film.

6. The decorative film according to claim 1, wherein an average thickness of the tabular metal particles is from 0.001 μm to 1 μm.

7. The decorative film according to claim 6, wherein an aspect ratio of the tabular metal particles is from 40 to 1000.

8. The decorative film according to claim 6, wherein an average major axis diameter of the tabular metal particles is from 1 μm to 100 μm.

9. The decorative film according to claim 6, wherein a content of the tabular metal particles in the metal-containing layer is from 5% by mass to 40% by mass with respect to a total mass of the metal-containing layer.

10. The decorative film according to claim 1, which is used for insert molding.

11. A decorative molded body comprising:
a molded base material; and
the decorative film according to claim 1 on the molded base material.

12. The decorative film according to claim 1, wherein a content of the binder resin in the metal-containing layer is from 20% by mass to 90% by mass with respect to the total mass of the metal-containing layer.

13. The decorative film according to claim 1, wherein a content ratio between the polymerizable compound and the binder resin is 0.20 or greater.

* * * * *